J. L. KNUDSON.
WELDING TORCH.
APPLICATION FILED JAN. 27, 1917.
1,319,097.
Patented Oct. 21, 1919.
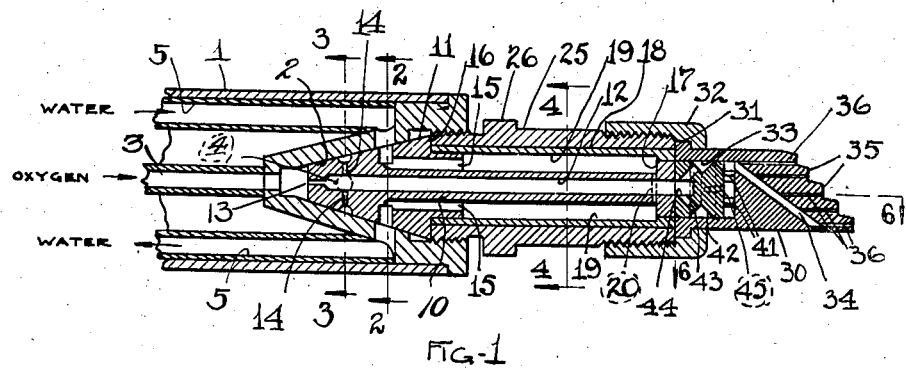
Fig. 1
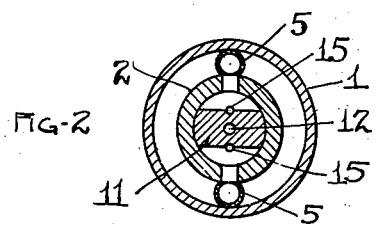
Fig. 2
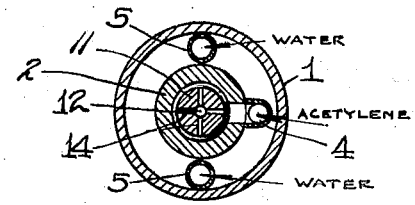
Fig. 3
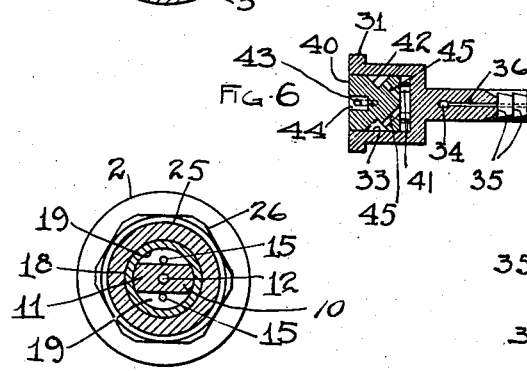
Fig. 6
Fig. 4
Fig. 5
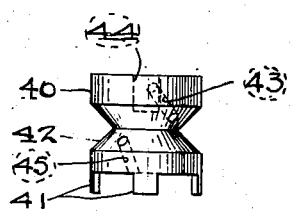
Fig. 7
INVENTOR
John L. Knudson.
BY Fay, Oberlin & Fay
ATTORNEYS

UNITED STATES PATENT OFFICE.

JOHN L. KNUDSON, OF LAKEWOOD, OHIO, ASSIGNOR TO THE STANDARD PARTS COMPANY, OF CLEVELAND, OHIO, A CORPORATION OF OHIO.

WELDING-TORCH.

1,319,097.        Specification of Letters Patent.        Patented Oct. 21, 1919.

Application filed January 27, 1917. Serial No. 144,803.

*To all whom it may concern:*

Be it known that I, JOHN L. KNUDSON, a citizen of the United States, and a resident of Lakewood, county of Cuyahoga, and State of Ohio, have invented a new and useful Improvement in Welding-Torches, of which the following is a specification, the principle of the invention being herein explained and the best mode in which I have contemplated applying that principle, so as to distinguish it from other inventions.

The present improvements relate more especially to torches of the so-called oxy-acetylene type, such as are employed in welding operations wherein a longitudinally extending seam is to be welded, as for example in the manufacture of tubing out of preliminarily formed blanks. In such a welding operation it has been customary to use a burner tip provided with a series of apertures forming jets which successively strike the seam or line along which the welding operation progresses. In order, however, to secure satisfactory results with a torch of this type, I have found that careful attention must be given to the character of these successive jets, so as to secure a properly accurate heating effect. Thus, those jets which first strike the seam, as the tube blank advances with respect to the torch or vice versa, should merely preliminarily heat such seam, the final heating being done by the last jet. It is of course also essential that a thorough mixing of the oxygen and acetylene gases be secured, if the heating effect of the jets is not to vary. With a view to accomplishing the foregoing, and other desirable objects, I have designed the present torch, which consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a central, axial cross-section of the forward end of a torch body, showing attached thereto a tip embodying my present improvements; Figs. 2, 3 and 4 are transverse sectional views of the same, the planes of the sections being indicated by the lines 2—2, 3—3 and 4—4, respectively, in Fig. 1; Fig. 5 is an end elevation of the device as viewed from the right in Fig. 1; Fig. 6 is a central axial section of the tip by itself, the plane of the section being at right angles to that of Fig. 1, as indicated by the line 6—6, Fig. 1; and Fig. 7 is a side elevational view, on an enlarged scale, of a mixing device which forms a feature of the tip structure.

As indicated, only the forward end of the body 1 of the torch is shown in the drawing, such body being of more or less familiar construction. Thus there is formed in such body end, a core seat, or socket 2, wherewith the various ducts or ports 3, 4 and 5, that supply oxygen, acetylene and water, respectively, to the tip holder are suitably connected. These ducts, it will be understood, are all contained within the body of the torch, suitable flexible leads (not shown) being connected thereto at the other end of such body.

The tip holder proper comprises a core-member 10 formed with a conical plug, or head 11, at one end, adapted to seat in the socket 2 in the forward end of the torch body 1, such head having an axial bore 12 adapted to communicate with the oxygen and acetylene supply ducts 3 and 4 through passages 13 and 14, respectively, and also two longitudinally extending passages 15, one on each side of such axial passage, which are adapted to communicate with water supply and exhaust ducts 5, respectively.

Such head is formed with a shoulder 16 on its forward face and the opposite end of the core member is formed with an annular ring 17, so that a tubular shell 18, when tightly fitted over such enlargement and against such shoulder, provides two water circulating chambers 19, one on each side of the core proper. Channels 20, one on each side of such core at the forward end of these chambers (shown in dotted outline in Fig. 1), serve to connect the same and permit the water to circulate in the fashion desired. Removably fitted over the shell and adapted to bear against the outer portion of the shoulder on the core head, is a sleeve 25, externally threaded at its inner end to engage internal threads in the torch body and provided with a polygonal portion 26 to receive a wrench or like tool. By means of such sleeve, the core, once its head is properly located in the socket, may be firmly secured in place, as will be obvious.

The construction of the tip-holder, as just described, constitutes no part of the present invention, it being to the tip, proper, that attention is more especially directed. Such tip 30, as will appear from reference to Figs. 1, 5 and 6, is externally of familiar form, except that instead of being made an integral part of the core, as in prevailing constructions, it is made a separate member having its rear face fitting snugly against the front end of such core, and provided with an external shoulder 31 by means of which it can be clamped against such core-end by a flanged cap 32 that is internally threaded to engage external threads on the forward ends of the sleeve 25.

The main body of the tip is hollowed out to form a chamber 33 of general cylindrical form from one edge of the bottom of which leads a passage 34 inclining more or less sharply to the longitudinal axis of the tip, and so lying more or less parallel with the similarly inclined series of steps 35, that form the operative edge of the tip. A corresponding series of orifices 36 lead from the passage 34, which serves as a header therefor, to the several steps. As a result of this arrangement the gases passing into the inclined header passage find their freest outlet through the first orifice, namely, that at the heel of the tip, while the pressure in such header decreases toward the toe, giving shorter and shorter jets for the pre-heating stage. In other words, there is a gradual increase in the heating effect from the toe to the heel.

In order to insure a thorough intermixture of the oxygen and acetylene, the mixing device 40, shown in side elevation in Fig. 7, and in cross-section in Figs. 1 and 6, respectively, is employed, such device consisting of a cylindrical block that fits loosely into the chamber and is spaced from the bottom thereof by means of projections 41 on its corresponding end. The sides of the member are cut away to form an encircling groove 42, with which two diverging passages 43, leading from the recess 44 in the inner end of the member, communicate, while two opposite inclined passages 45, displaced ninety degrees about the axis of the member from such first named passages, lead from the groove 42 to the space between the member and the bottom of the chamber. The partially mingled gases received from the bore 12, it will thus be seen, are caused to follow a divided and circuitous path through the device, which insures their thorough mixture, and, when they are finally allowed to enter the space in the bottom of the chamber, it is at points removed from the header opening, which is entirely at one side of the chamber, and the final mixing occurs in this space.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A burner tip for a welding torch, having a chamber in one end, the opposite end of said tip being formed with a series of alined steps, a header-passage leading from one side of said chamber, and a plurality of discharge orifices leading from such passage to said steps, respectively.

2. A burner tip for a welding torch, having a cylindrical chamber in one end, the opposite end of said tip being formed with a series of alined steps inclined to the longitudinal axis of said tip, a header passage leading from one side of said chamber and similarly inclined, and a plurality of discharge orifices leading from such passage to said steps, respectively.

3. The combination with a burner tip having a chamber in one end, an inclined passage connected to said chamber and a series of alined discharge orifices connecting such passage with the opposite end of said tip, of a mixing device in such chamber, comprising a loosely inserted member formed with a series of non-alined passages, substantially as described.

4. The combination with a burner tip having a cylindrical chamber in one end, an inclined passage connected to said chamber and a series of alined discharge orifices connecting such passage with the opposite end of said tip, of a mixing device in said chamber, comprising a loosely inserted cylindrical block formed with an encircling groove and with non-alined passages connecting its respective ends with such groove.

5. A burner tip having a cylindrical chamber on one end, a header passage leading from one side of said chamber, and a mixing device in said chamber comprising a member formed with a series of non-alined passages, such passages in said member being out of alinement with such header passage.

6. A burner tip having a cylindrical chamber on one end, a header passage leading from one side of said chamber, and a mixing device in said chamber comprising a cylindrical block formed with an encircling groove and with non-alined passages connecting its respective ends with said groove, such passages in said block being out of alinement with such header passage.

Signed by me, this 23 day of January, 1917.

JOHN L. KNUDSON.